(12) United States Patent
Yanazawa et al.

(10) Patent No.: US 10,647,270 B2
(45) Date of Patent: May 12, 2020

(54) WIRE HARNESS

(71) Applicants: YAZAKI CORPORATION, Tokyo (JP); TOYOTA JIDOSHA KABUSHIKI KAISHA, Toyota-shi, Aichi-ken (JP)

(72) Inventors: Kenta Yanazawa, Makinohara (JP); Hideomi Adachi, Makinohara (JP); Hiroyuki Yoshida, Makinohara (JP); Yoshiyuki Ishihara, Toyota (JP)

(73) Assignees: YAZAKI CORPORATION, Tokyo (JP); TOYOTA JIDOSHA KABUSHIKI KAISHA, Aichi-ken (JP)

( * ) Notice: Subject to any disclaimer, the term of this patent is extended or adjusted under 35 U.S.C. 154(b) by 0 days.

(21) Appl. No.: 15/259,295

(22) Filed: Sep. 8, 2016

(65) Prior Publication Data

US 2017/0066390 A1 Mar. 9, 2017

(30) Foreign Application Priority Data

Sep. 9, 2015 (JP) .................. 2015-177223

(51) Int. Cl.
  *B60R 16/02* (2006.01)
  *H01B 7/18* (2006.01)

(52) U.S. Cl.
  CPC ......... *B60R 16/0215* (2013.01); *H01B 7/184* (2013.01)

(58) Field of Classification Search
  CPC ...... H02G 3/04; H02G 3/0462; H02G 3/0468; H02G 15/007; B60R 16/0215; H01B 7/0869; H01B 7/16; H01B 7/17; H01B 7/18; H01B 7/1805; H01B 7/1815; H01B 7/182; H01B 7/02; H01B 7/189; H01B 13/18; H01B 13/185; H01B 13/20; H01B 13/204; H01B 13/206; H01B 13/208; H01B 7/184

(Continued)

(56) References Cited

U.S. PATENT DOCUMENTS 471,588 A * 3/1892 Williams ........... H01B 11/1847
                                            174/29
3,609,207 A * 9/1971 Maschio ............. H01B 7/0208
                                          174/120 FP (Continued)

FOREIGN PATENT DOCUMENTS

EP    2784786 A1 * 10/2014
JP    56-62614 U    10/1954
(Continued)

OTHER PUBLICATIONS

Kohnen,Wolfgang (EP2784786A1) provided with Office Action (Year: 2014).*

(Continued)

*Primary Examiner* — Roshn K Varghese
(74) *Attorney, Agent, or Firm* — Sughrue Mion, PLLC (57) ABSTRACT

A wire harness includes: a tubular outer member; and a conductive path which is inserted in and protected by the outer member. The conductive path includes a vibration suppressing portion which reduces a movable space of the conductive path at a prescribed position inside the outer member to suppress shaking of the conductive path. The vibration suppressing portion is formed by a partially increased thickness portion of a covering of the conductive path.

4 Claims, 7 Drawing Sheets

(58) Field of Classification Search
USPC .................................. 174/113 C, 29, 113 AS
See application file for complete search history.

(56) References Cited

U.S. PATENT DOCUMENTS

| | | | | |
|---|---|---|---|---|
| 3,710,440 | A * | 1/1973 | Nevin | B29C 44/324 |
| | | | | 174/36 |
| 3,928,519 | A * | 12/1975 | Kashiyama | B29C 47/02 |
| | | | | 174/105 R |
| 5,192,834 | A * | 3/1993 | Yamanishi | H01B 7/0233 |
| | | | | 174/110 F |
| 5,829,485 | A * | 11/1998 | Fatato | H02G 3/0468 |
| | | | | 138/110 |
| 2011/0297415 | A1 | 12/2011 | Katou et al. | |
| 2013/0056240 | A1 * | 3/2013 | Kawai | H02G 3/0481 |
| | | | | 174/124 R |

FOREIGN PATENT DOCUMENTS

| | | | |
|---|---|---|---|
| JP | 61-68805 | A | 4/1986 |
| JP | 02097721 | U1 | 8/1990 |
| JP | 06109172 | A | 4/1994 |
| JP | 2006231939 | A | 9/2006 |
| JP | 2009143326 | A * | 7/2009 |
| JP | 2011-254614 | A | 12/2011 |

OTHER PUBLICATIONS

Office Action dated Nov. 28, 2017, by the Japanese Patent Office in counterpart Japanese Application No. 2015-177223.

Communication dated Feb. 27, 2018, issued by the Japanese Patent Office in counterpart Japanese Patent Application No. 2015-177223.

Notification of Reasons for Refusal, dated Aug. 31, 2017, in corresponding JP Application No. 2015-177223, 6 pages in English and Japanese.

* cited by examiner

WIRE HARNESS

CROSS-REFERENCE TO RELATED APPLICATION(S)

This application is based on and claims priority from Japanese Patent Application (Application No. 2015-177223) filed on Sep. 9, 2015, the entire contents of which are incorporated herein by reference.

BACKGROUND

1. Field of the Invention

The present invention relates to a wire harness having a tubular outer member and one or plural conductive paths that are inserted in and protected by the outer member.

2. Description of Related Art

Wire harnesses are used for electrically connecting apparatus installed in an automobile. Wire harnesses are equipped with a tubular outer member and one or plural conductive paths housed in the outer member. For example, JP-A-2011-254614 discloses a wire harness which is long and is routed so that part of it runs under the floor of an automobile. The portion, running under the floor of the automobile, of the wire harness goes straightly. In the wire harness disclosed in JP-A-2011-254614, a phenomenon occurs that in its straightly routed portion the conductive path(s) housed in the outer member shakes due to vibration etc. that occur while the automobile is running.

SUMMARY

In the above conventional wire harness, when the conductive path(s) housed in the outer member shakes widely due to vibration that occurs while the automobile is running, a covering (an outside braid or metal foil of the conductive path(s) in the case where it has a shield function) of the conductive path(s) may hit the inner surface of the outer member strongly and thereby be damaged.

The present invention has been made in view of the above circumstances, and an object of the invention is therefore to provide a wire harness capable of suppressing shaking of a conductive path(s) inside an outer member.

In a first aspect of the present invention, there is provided a wire harness including: a tubular outer member; and a conductive path which is inserted in and protected by the outer member, wherein the conductive path includes a vibration suppressing portion which reduces a movable space of the conductive path at a prescribed position inside the outer member to suppress shaking of the conductive path, and wherein the vibration suppressing portion is formed by a partially increased thickness portion of a covering of the conductive path.

According to the first aspect of the invention, by forming the vibration suppressing portion at the prescribed position inside the outer member, the amplitude of shakes of the conductive path can be suppressed at the position by decreasing the movable space at the position. Thus, this aspect of the invention contributes to suppression of shaking of the conductive path relative to the outer member.

In a second aspect of the present invention, there is provided the wire harness according to the first aspect, wherein the vibration suppressing portion is formed at least in a region where the outer member is to be routed straightly.

According to the second aspect of the invention, the covering of the conductive path is formed with the vibration suppressing portions in a region where the wire harness is to be routed straightly and the conductive path is likely to shake. Thus, this aspect of the invention contributes to suppression of shaking of the conductive path relative to the outer member even in a region where the wire harness is likely to shake.

According to the first aspect of the invention, since the vibration suppressing portion is formed by the partially increased thickness portion of the covering of the conductive path, this aspect of the invention provides an advantage that shaking of the conductive path in the outer member can be suppressed even when, for example, the vehicle is running. This provides an advantage that the covering (for example, an outside braid or metal foil of the conductive path in the case where it has a shield function) of the conductive path can be prevented from being damaged.

The second aspect of the invention provides an advantage that shaking of the conductive path in the outer member can be suppressed even in a region where the outer member is to be routed straightly, that is, the wire harness is likely to shake.

BRIEF DESCRIPTION OF THE DRAWINGS

FIGS. 1A and 1B show wire harnesses according to an embodiment of the present invention.

DETAILED DESCRIPTION

The present invention provides a wire harness which is equipped with a tubular outer member and one or plural conductive paths which are inserted in and protected by the outer member. The (each) conductive path has one or plural vibration suppressing portions. The vibration suppressing portions are portions for suppressing shaking of the conductive path by reducing movable spaces of the outer member in the outer member at respective prescribed positions inside the outer member. More specifically, the vibration suppressing portions are formed by partially increasing the thickness of a covering of the conductive path. By forming the vibration suppressing portions, shaking of the conductive path relative to the outer member can be suppressed.

Figure 1A:
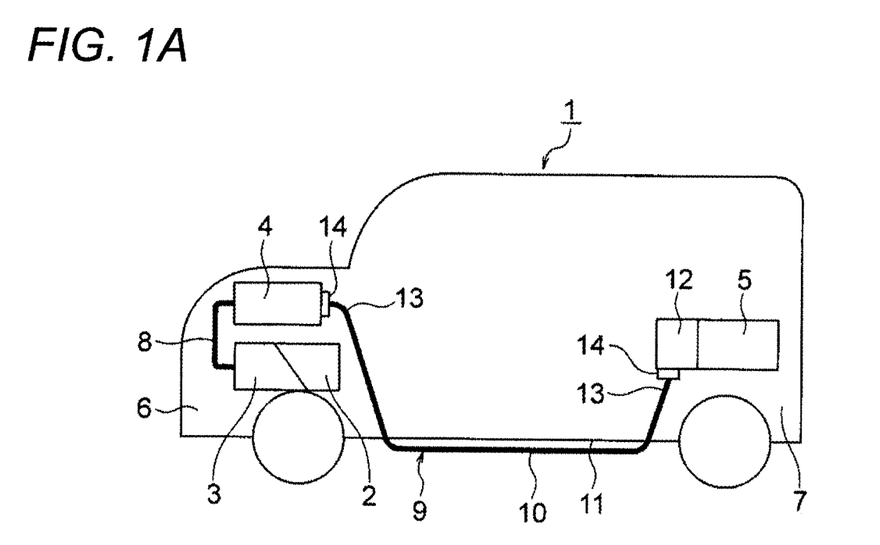
FIG. 1A is a schematic diagram showing how a high-voltage wire harness is routed and FIG. 1B is a schematic diagram showing how another wire harness, that is, a low-voltage wire harness, is routed.
Figure 1B:
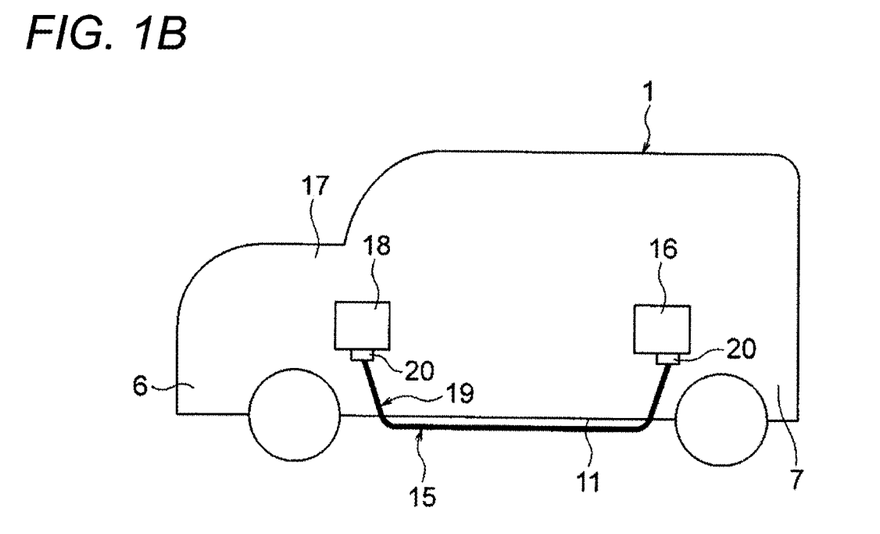
Figure 2:
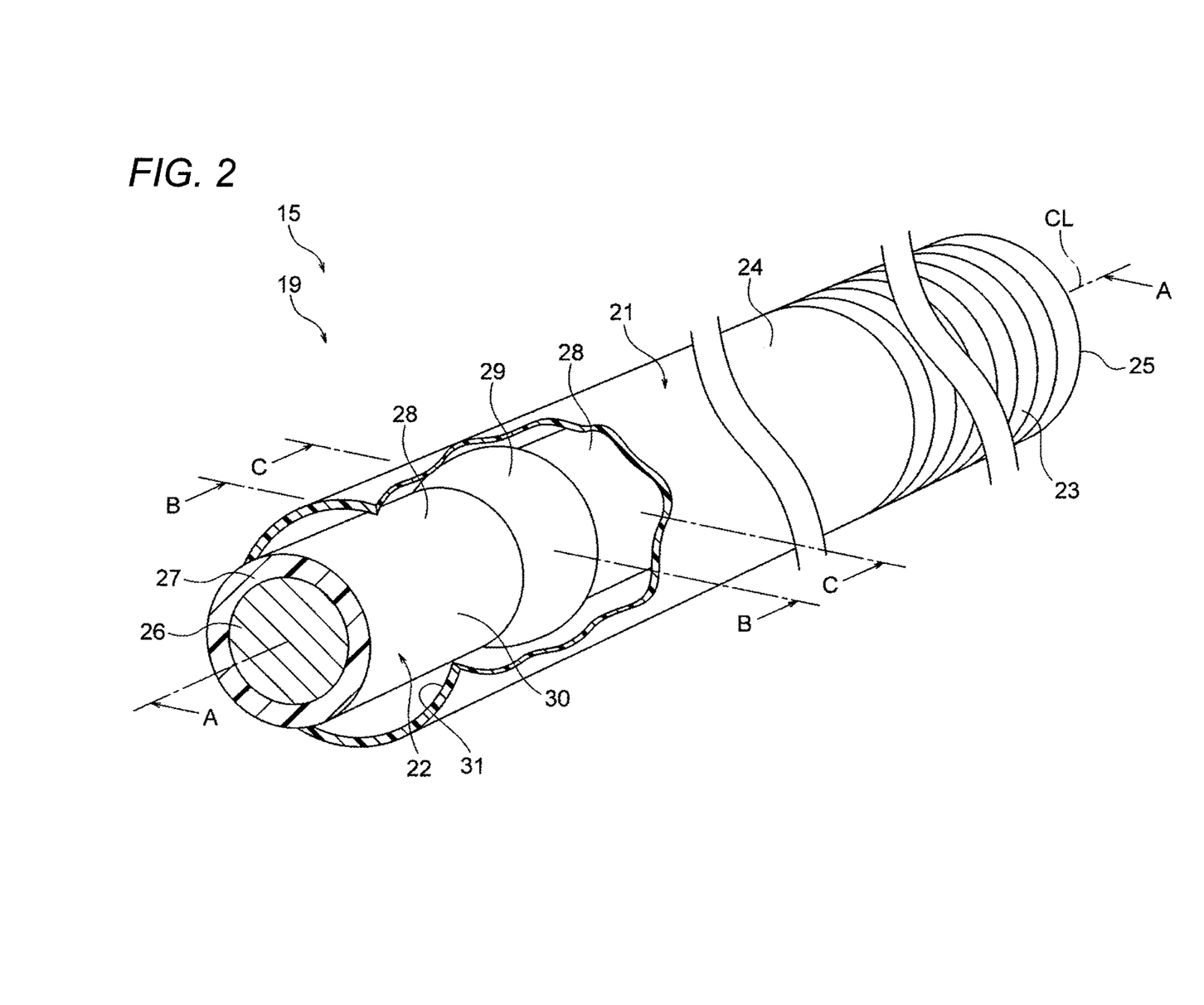
FIG. 2 is a perspective view showing the configuration of a wire harness according to the embodiment.
Figure 3:
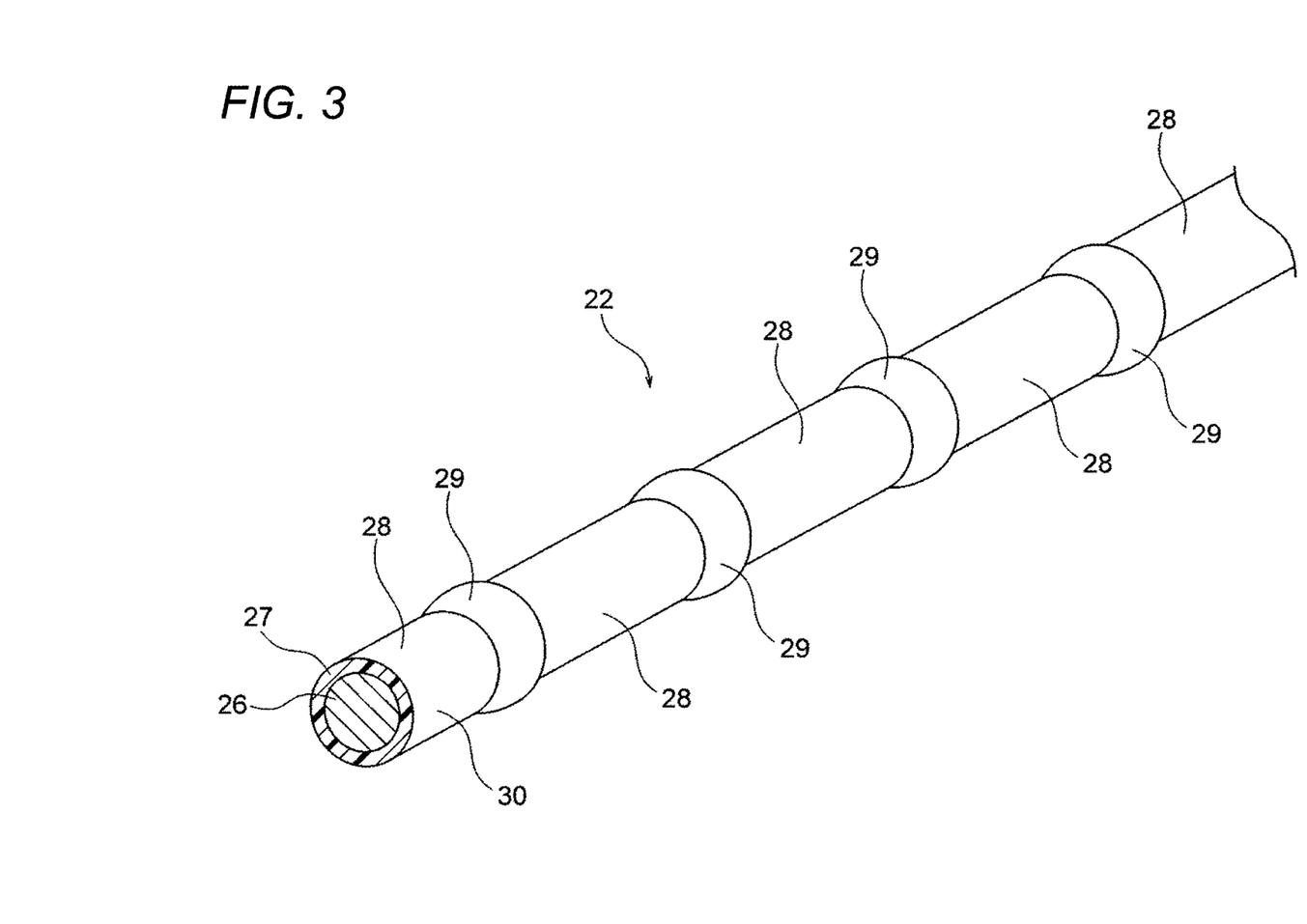
FIG. 3 is a perspective view of a conductive path shown in FIG. 2.
Figure 4:
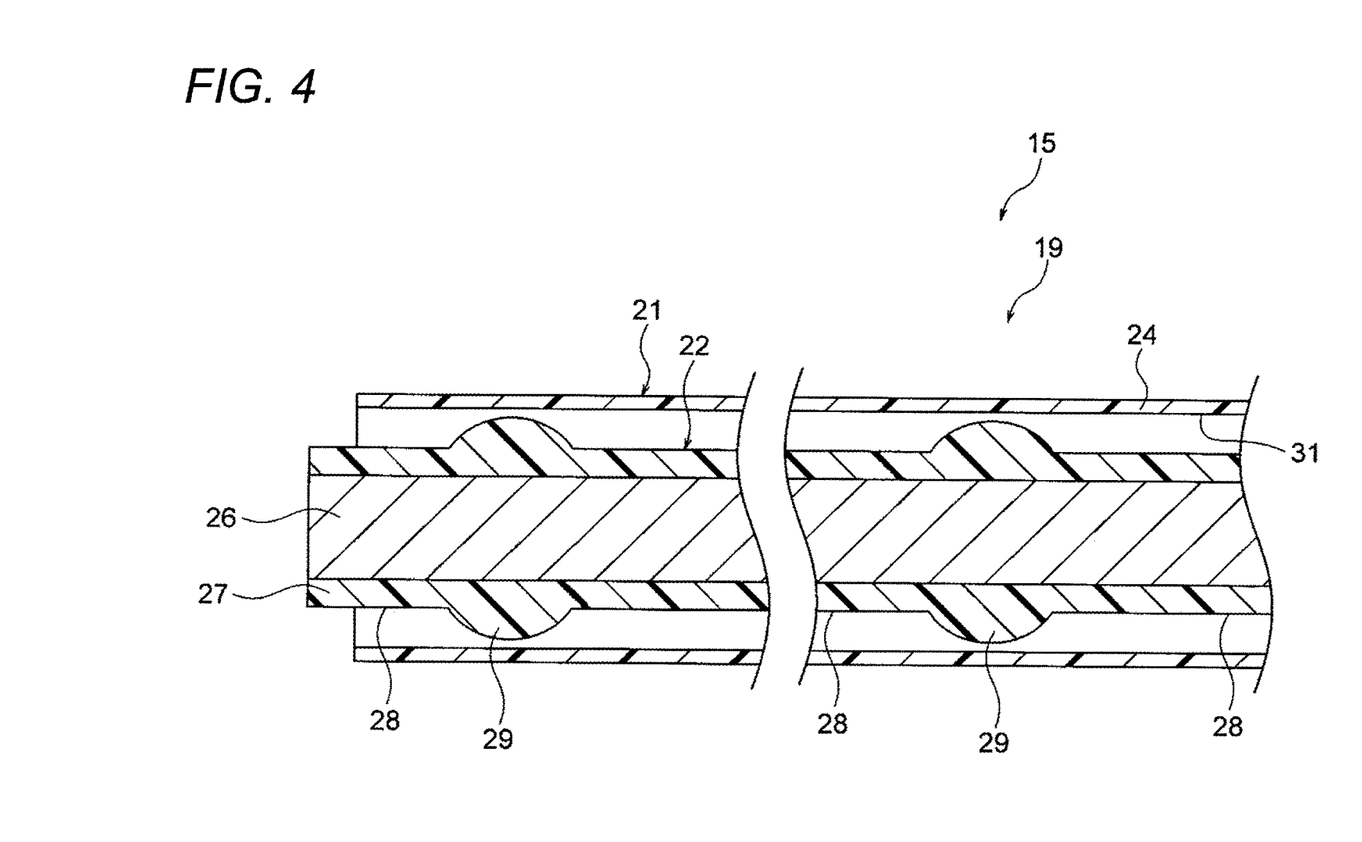
FIG. 4 is a sectional view taken along line A-A in FIG. 2.
Figure 5A:
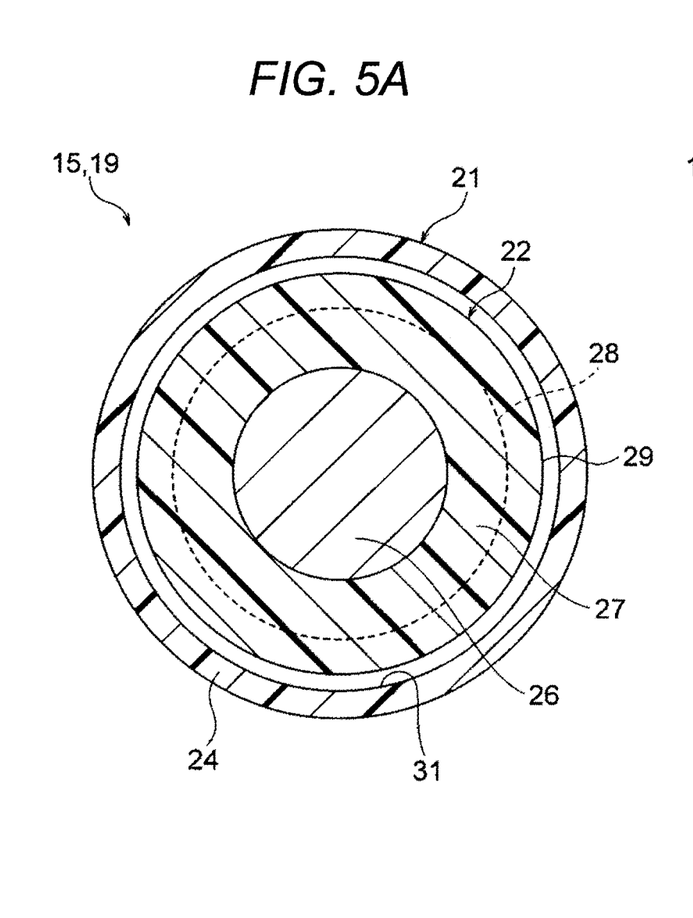
FIGS. 5A and 5B are sectional views taken along lines B-B and C-C in FIG. 2, respectively.
Figure 5B:
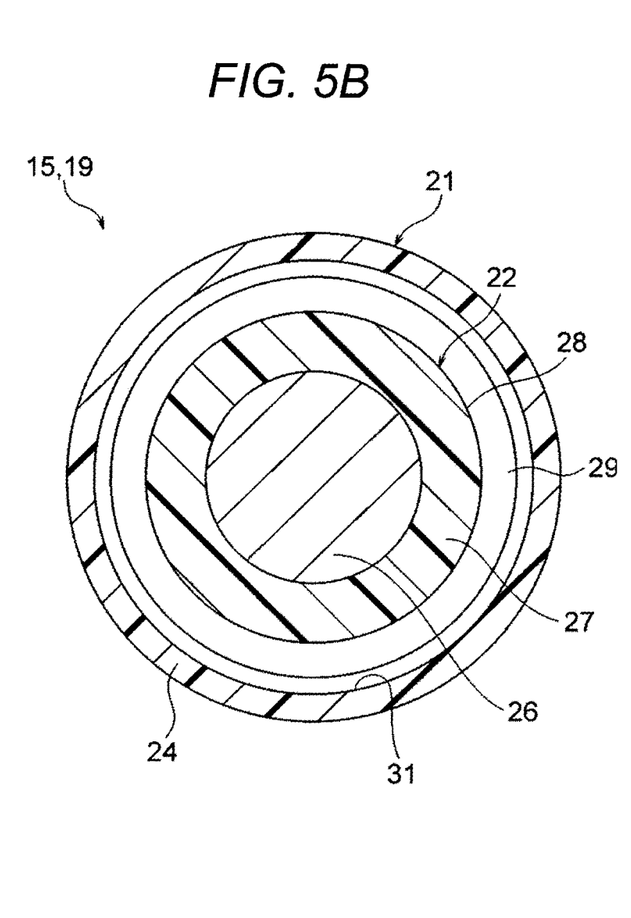
Figure 6:
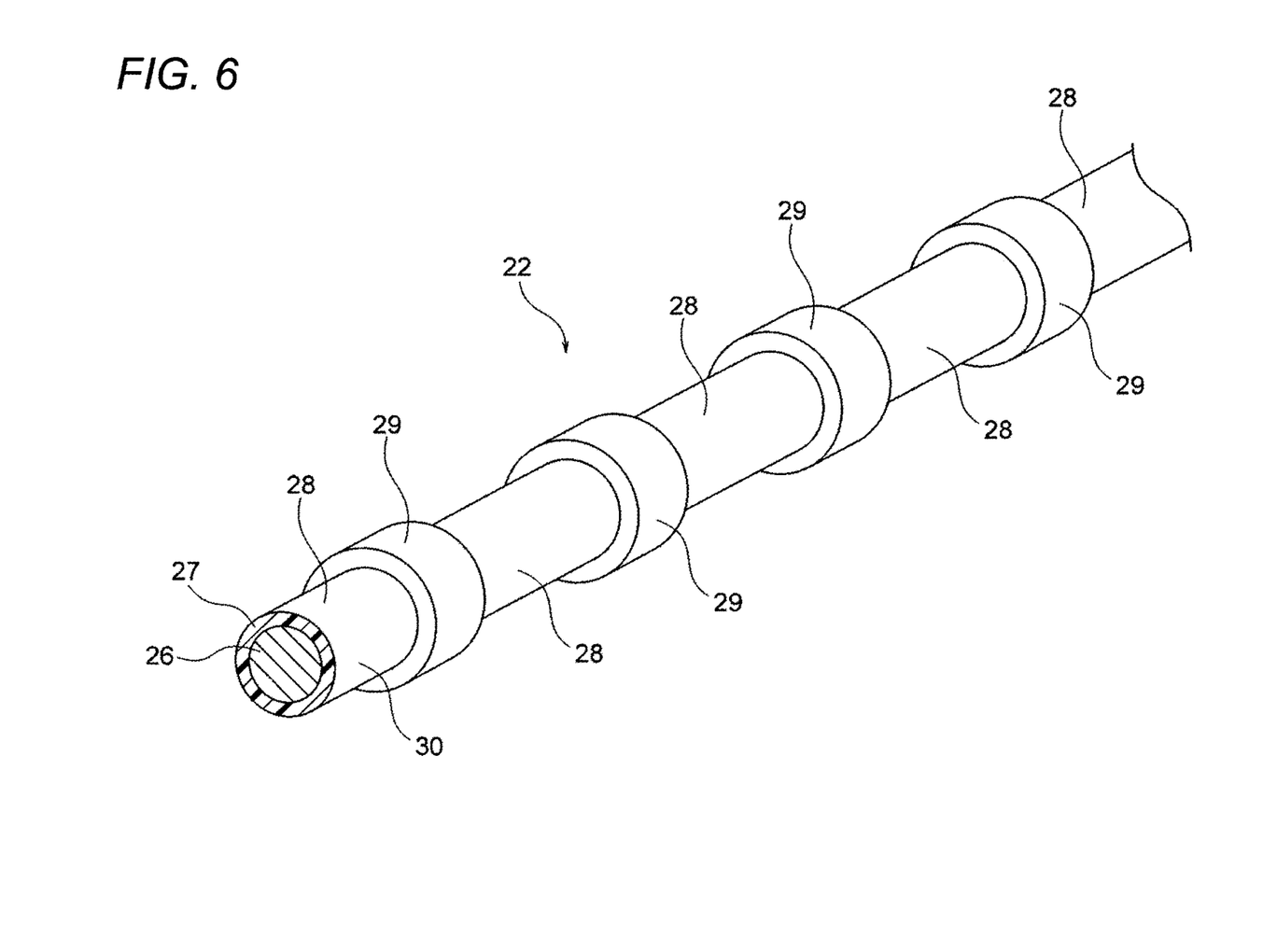
FIG. 6 is a perspective view of a conductor path used in a modification of the embodiment.
Figure 7:
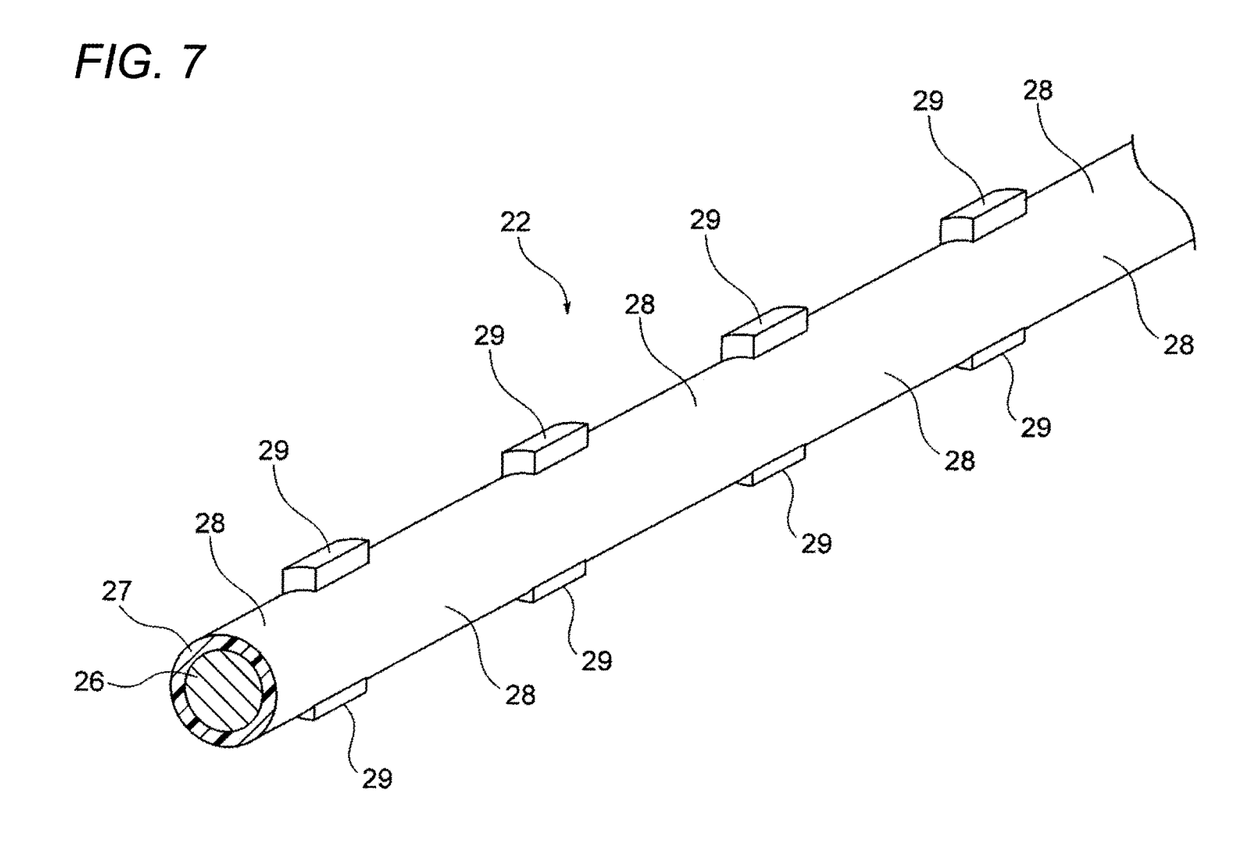
FIG. 7 is a perspective view of a conductor path used in another modification.

An embodiment of the invention will be hereinafter described with reference to the drawings. FIGS. 1A and 1B show wire harnesses according to an embodiment of the present invention; FIG. 1A is a schematic diagram showing how a high-voltage wire harness is routed and FIG. 1B is a schematic diagram showing how another wire harness, that is, a low-voltage wire harness, is routed. FIG. 2 is a perspective view showing the configuration of the wire harness according to the embodiment. FIG. 3 is a perspective view of a conductive path shown in FIG. 2. FIG. 4 is a sectional view taken along line A-A in FIG. 2. FIGS. 5A and 5B are sectional views taken along lines B-B and C-C in FIG. 2, respectively. FIGS. 6 and 7 are perspective views of conductor paths used in respective modifications of the embodiment.

The embodiment is such that the invention is applied to a wire harness that is routed in a hybrid vehicle. (The invention may also be applied to an electric vehicle, an ordinary automobile that runs using an engine, and the like).

<Configuration of Hybrid Vehicle 1>

As shown in FIG. 1A, a hybrid vehicle 1 is driven by mixing two kinds of motive power of an engine 2 and a motor unit 3. Electric power is supplied from a battery (battery pack) 5 to the motor unit 3 via an inverter unit 4. In the embodiment, the engine 2, the motor unit 3, and the inverter unit 4 are mounted in an engine room 6 which is located adjacent to the front wheels etc. The battery 5 is mounted in a vehicle rear part 7 where the rear wheels etc. are disposed (or may be mounted in a vehicle compartment which is located in the rear of the engine room 6).

The motor unit 3 and the inverter unit 4 are connected to each other by a high-voltage wire harness (high-voltage motor cable) 8. Likewise, the battery 5 and the inverter unit 4 are connected to each other by a high-voltage wire harness 9. An intermediate portion 10 of the wire harness 9 is routed under a vehicle floor 11 of the vehicle (vehicle body) approximately parallel with it. The vehicle floor 11, which is a known vehicle body part and is what is called a panel member, is formed with through-holes at prescribed positions. The wire harness 9 is inserted through the through-holes water-tightly.

The wire harness 9 and the battery 5 are connected to each other via a junction block 12 which is attached to the battery 5. An external connection means such as a shield connector 14 provided for a rear-end harness terminal 13 of the wire harness 9 is electrically connected to the junction block 12. The wire harness 9 is electrically connected to the inverter unit 4 via an external connection means such as another shield connector 14 provided for a front-end harness terminal 13 of the wire harness 9.

The motor unit 3 includes a motor and a generator, and the inverter unit 4 includes an inverter and a converter. The motor unit 3 is implemented as a motor assembly including a shield case. Likewise, the inverter unit 4 is implemented as an inverter assembly including a shield case. The battery 5 is of a Ni-MH type or a Li-ion type and is implemented as a module. Alternatively, a storage device such as a capacitor can be used as the battery 5. It goes without saying that there are no particular limitations on the battery 5 as long as it can be used for the hybrid vehicle 1 (or an electric vehicle).

As shown in FIG. 1B, a wire harness 15, which is a low-voltage wire harness, is provided to electrically connect a low-voltage battery 16 disposed in the vehicle rear part 7 of the hybrid vehicle 1 to an auxiliary device (device) 18 mounted in a vehicle font part 17. Like the wire harness 9 shown in FIG. 1A, part of the wire harness 15 is routed under the vehicle floor 11 (this is just an example; it may be routed on the compartment side).

As shown in FIGS. 1A and 1B, the high-voltage wire harnesses 8 and 9 and the low-voltage wire harness 15 are routed in the hybrid vehicle 1. Although the invention is applicable to any of them, the following description will be made of a representative one, that is, the low-voltage wire harness 15.

<Configuration of Wire Harness 15>

As shown in FIG. 1B, the long wire harness 15, part of which is routed straightly under the vehicle floor 11, is equipped with a harness main body 19 and connectors 20 provided for the two respective terminals of the harness main body 19. The wire harness 15 is also equipped with fixing members (e.g., clamps; not shown) for wiring itself along a prescribed route and water stop members (e.g., grommets; not shown).

<Configuration of Harness Main Body 19>

As shown in FIG. 2, the harness main body 19 is equipped with an outer member 21 and one conductive path 22 which is housed in and protected by the outer member 21. Although the wire harness 15 according to the embodiment have the one conductive path 22, it is just an example and wire harnesses having three or more conductive paths 22 are possible. A wire harness having plural conductive paths 22 may incorporate a high-voltage conductive path. The structure of the outer member 21 of the harness main body 19 will be described first and the structure of its conductive path 22 will be described thereafter.

<Structure of Outer Member 21>

As shown in FIG. 2, the outer member 21 is formed by resin molding as a single, straight (before use) tubular member. (In the invention, the material of the outer member 21 is not limited to a resin; it may be made of a metal.) In the embodiment, the outer member 21 is incapable of longitudinal division; in other words, it has no slit(s). The outer member 21 is circular in cross section (the sectional shape of the outer member 21 is not limited to a true circle and may be an ellipse, a rectangle, or the like).

The outer member 21 has plural flexible tube portions 23 and plural straight tube portions 24 for straight routing of the conductive path 22. The flexible tube portions 23 and straight tube portions 24 are formed alternately.

<Flexible Tube Portions 23>

The flexible tube portions 23 (see FIG. 2) are disposed so as to conform to shapes of attachment (fixing) target portions (wire harness routing target portions) of the vehicle body and has lengths that are not constant but suitable for the shapes of the attachment (fixing) target portions. The flexible tube portions 23 are formed so as to be able to be bent at desired angles when the wire harness 15 is packed, transported, or wired along a prescribed route in a vehicle (see FIG. 1B). That is, each flexible tube portion 23 is formed so that it can not only be bent but also be returned, naturally, to the original straight shape (i.e., the shape as resin-molded; see FIG. 2).

In the embodiment, each flexible tube portion 23 is formed like a bellows tube (the shape of each flexible tube portion 23 is not limited any particular shape as long as it is flexible). More specifically, each flexible tube portions 23 has circumferential bellows recesses and bellows projections which are arranged continuously and alternately in the tube axial direction. Alternatively, the whole of the outer member 21 may be formed like a bellows tube. Reference numeral 25 denotes one opening of the outer member 21.

<Straight Tube Portion 24>

The straight tube portions 24 (see FIG. 2) are portions which are not flexible unlike the flexible tube portions 23. The straight tube portions 24 are formed as portions that are not bent when the wire harness 15 is packed, transported, or wired along a prescribed route in a vehicle (the term "are not bent" means that the straight tube portions 24 are not given flexibility in a positive sense). The straight tube portion 24 shown in FIG. 2 is shaped like a long straight tube.

The straight tube portions 24 are more rigid than the flexible tube portions 23. The straight tube portions 24 are formed at such positions and have such lengths as to be suitable for shapes of attachment (fixing) target portions of the vehicle body. In the embodiment, the straight tube portions 24 are formed as portions to be disposed at least under the vehicle floor 11 (see FIG. 1B).

<Structure of Conductive Path 22>

As shown in FIG. 2 to FIGS. 5A and 5B, the conductive path 22 has a conductor 26 and an insulator (covering) 27 which is located outside the conductor 26. The conductor 26 is made of copper, a copper alloy, aluminum, or an aluminum alloy and is circular in cross section. The conductor 26 may be formed by twisting element wires together or have a rod structure that is rectangular or circular in cross section (e.g., a rectangular core or circular core conductor; in this case, the harness main body 19 also has a rod structure). The insulator 27 which is made of an insulative resin material is formed on the outer circumferential surface of the conductor 26 by extrusion molding.

The insulator 27 is formed on the outer circumferential surface of the conductor 26 by extrusion molding using a thermoplastic resin material. The insulator 27 is composed of an insulator body 28 and plural vibration suppressing portions 29 which characterize the invention. The thermoplastic resin material for the insulator 27 is selected as appropriate from various known materials, for example, polymeric materials such as a polyvinyl chloride resin, a polyethylene resin, and a polypropylene resin.

The insulator body 28 is formed so as to be circular in cross section and have the same diameter as in conventional cases. On the other hand, the vibration suppressing portions 29 are formed in regions where to suppress shaking of the conductive path 22. As mentioned above, the vibration suppressing portions 29 are portions that characterize the invention.

<Vibration Suppressing Portion 29>

As shown in FIG. 2 to FIGS. 5A and 5B, the vibration suppressing members 29 are formed so as to make the insulator 27 thicker than the insulator body 28. In other words, the vibration suppressing portions 29 are increased thickness portions that project from the outer circumferential surface 30 of the insulator body 28 toward the inner circumferential surface 31 of the outer member 21. The vibration suppressing portions 29 are formed at prescribed positions where to decrease a play ratio (i.e., the proportion of the space in the outer member 21 in which the conductive path 22 can shake) of the conductive path 22 inside the outer member 21. In other words, the movable spaces of the conductive path 22 are reduced by the vibration suppressing portions 29 at the respective prescribed positions. As shown in FIG. 2 to FIGS. 5A and 5B, each vibration suppressing portion 29 is an increased thickness portion has a spherical surface in cross section. (The invention is not limited to this case; each vibration suppressing portion 29 may be cylindrical (see FIG. 6) or in rib form (see FIG. 7).

The vibration suppressing portions 29 are formed (disposed) at positions where to suppress shaking of the conductive path 22. Each vibration suppressing portion 29 is formed so as to increase the thickness of the insulator 27 at least in a direction in which vibration would occur. In the embodiment, the vibration suppressing portions 29 are arranged at prescribed intervals (e.g., 200 mm) along the center axis CL (this is just an example; only one vibration suppressing portion 29 may be formed). The vibration suppressing portions 29 are formed so as to project to such an extent that they do not make it difficult to insert the conductive path 22 into the outer member 21 from its one opening 25 to its other opening.

The vibration suppressing portions 29 are formed by varying the operation speed of an extrusion molding machine in extrusion-molding the insulator 27. Alternatively, the vibration suppressing portions 29 are formed by varying the diameter of a cap of an extrusion molding machine. Using an extrusion molding machine, the vibration suppressing portions 29 can be formed automatically without requiring a worker to do any cumbersome work.

<Manufacturing Method of Wire Harness 15>

To manufacture the wire harness 15 shown in FIG. 1B, the harness main body 19 is manufactured first and then terminal working is done. Referring to FIG. 2, the harness main body 19 is manufactured by inserting the conductive path 22 into the outer member 21 from its one opening 25 toward the other opening. When the conductive path 22 has been inserted in the outer member 21, at the positions where the vibration suppressing portions 29 exist, the proportion of the space where the conductive path 22 shakes is decreased as seen from FIGS. 4 and 5. That is, the play ratio of the conductive path 22 is decreased.

<Summary, Including Advantages, of the Invention>

As described above with reference to FIGS. 1A and 1B to FIGS. 5A and 5B, the wire harness 15 according to the invention is equipped with the tubular outer member 21 and the conductive path 22 which is inserted in and protected by the outer member 21. The conductive path 22 has the plural vibration suppressing portions 29 which characterize the invention. The vibration suppressing portions 29 are portions for suppressing shaking of the conductive path 22 by decreasing its play ratio at prescribed positions inside the outer member 21. More specifically, the vibration suppressing portions 29 are formed by increasing the thickness of the insulator 27 of the conductive path 22 partially. By forming the vibration suppressing portions 29, shaking of the conductive path 22 relative to the outer member 21 can be suppressed.

Thus, in the wire harness 15 according to the invention, since the conductive path 22 is formed with the vibration suppressing portions 29, shaking of the conductive path 22 in the outer member 21 can be suppressed even when, for example, the vehicle is running. This solves the problem that the insulator 27 of the conductive path 22 hits the inner surface 31 of the outer member 21 strongly and is thereby damaged.

As is understood from the above description, the formation of the vibration suppressing portions 29 makes it possible to suppress shaking of the conductive path 22 relative to the outer member 21. In the invention, even if the conductive path 22 hits the inner surface 31 of the outer member 21, the conductive path 22 is not damaged because hits are much weaker than in conventional cases (in the case where the conductive path 22 has a shield function, a braid or metal foil is not damaged so as to cause any trouble).

<Modifications>

Whereas in the embodiment the conductive path 22 has the vibration suppressing portions 29 each of which has a spherical surface in cross section (see FIG. 3), modifications are possible in which each vibration suppressing portion 29 is cylindrical (see FIG. 6) or in rib form (see FIG. 7).

It is matter of course that various modifications may be made without departing from the spirit and scope of the invention.

What is claimed is:

1. A wire harness comprising:
   a tubular outer member; and
   a conductive path which is disposed in and protected by the outer member, such that there is a moveable space in which the conductive path is movable in a radial direction with respect to the tubular outer member between the conductive path and the outer member, the conductive path including a conductor and an insulator surrounding and directly contacting the conductor, wherein the insulator includes discrete vibration suppressing ribs spaced apart so as to reduce the movable space at prescribed longitudinally spaced positions inside the outer member to suppress shaking of the conductive path, wherein the vibration suppressing ribs are formed by a partially increased thickness portion of the insulator, wherein the vibration suppressing ribs have an increased thickness partially in a circumferential direction of the insulator, and in a cross-sectional view on a plane perpendicular to an axial direction of the insulator and passing through a rib of the vibration suppressing ribs, a radial outer diameter at a first portion of the insulator where the rib is provided is larger than a radial outer diameter at a second portion of the insulator where the rib is not provided, wherein the conductor and the insulator extend straightly through a length of a straight portion of the tubular outer member, and wherein in a view of a cross section perpendicular to the length of the straight portion, the vibration suppressing ribs and the conductor comprise more than half of the cross section in a radial direction of an interior of the tubular outer member.

2. The wire harness according to claim 1, wherein the vibration suppressing ribs are formed at least in a region where the outer member is straight.

3. The wire harness according to claim 1, wherein the insulator is extruded onto the outer surface of the conductor.

4. The wire harness according to claim 1, wherein the outer member comprises a flexible portion and an inflexible portion.

\* \* \* \* \*